Nov. 2, 1965     H. BODAN     3,215,287
STOCK FEED ATTACHMENT
Filed June 1, 1962
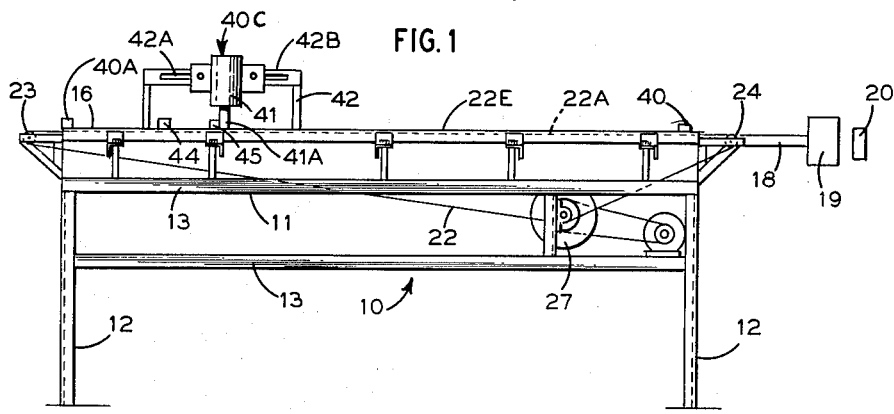
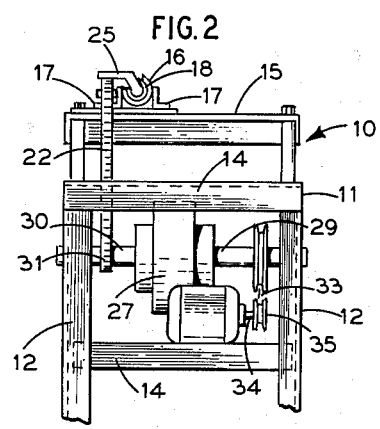
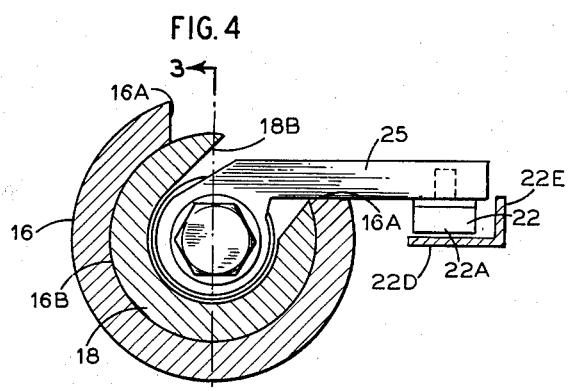
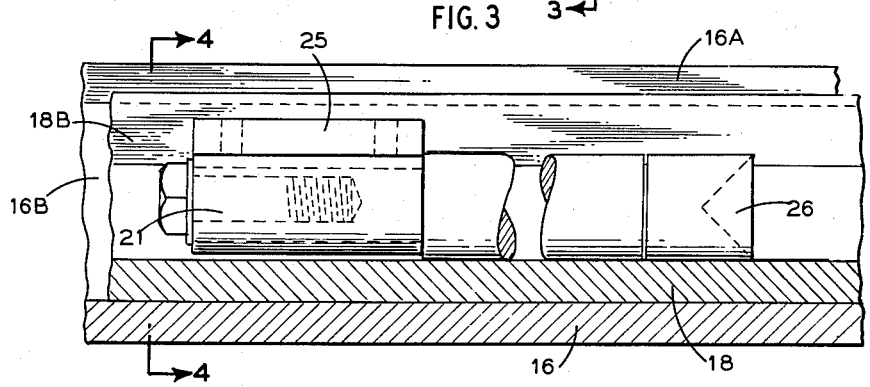
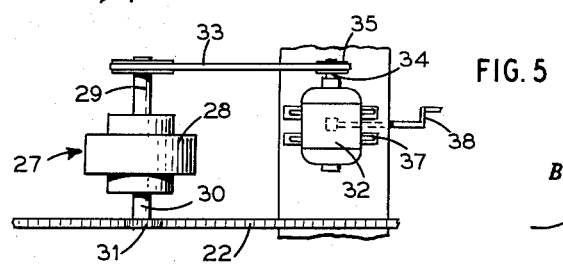
INVENTOR.
Howard Bodan
BY *Irving Seidman*
ATTORNEY

United States Patent Office 3,215,287
Patented Nov. 2, 1965

3,215,287
STOCK FEED ATTACHMENT
Howard Bodan, 33—51 73rd St., Jackson Heights, N.Y.
Filed June 1, 1962, Ser. No. 199,875
6 Claims. (Cl. 214—1.5)

This invention relates to a stock feed attachment, and more specifically to a stock feed attachment for use in feeding elongated stock material to an automatic machine having a repetitive operation.

Heretofore, feeding elongated stock to the stock holding mechanism of an automatic machine performing a repetitive operation, e.g. an automatic screw machine, turret lathe, cut-off saw and the like, has been affected by an air actuated pusher or the like. In operation such air actuated pusher advances or feeds the stock by a pulse of air actuating an air piston each time the holding mechanism or collet of an automatic machine is opened. Pulse actuation of such air piston advanced the stock in a manner which caused the stock to be slammed against the stop associated with the holding mechanism. Feeding the stock in this manner frequently resulted in the stock springing back after striking the stop. As a result positive and accurate positioning of the stock by air operated feed mechanisms relative to the operating tool of the automatic machine was not always possible.

Therefore, an object of this invention is to provide an improved stock feeding attachment for accurately and positively feeding stock of short or long lengths to the holding mechanism of an automatic machine each time the feed attachment is rendered operative.

Another object is to provide a stock feed attachment adaptable for feeding a stock material automatically to either a rotating machine or to a plain axial advance feedout.

Another object is to provide a stock feed attachment adaptable to accommodate varying stock sizes and shapes, e.g. flat stock or other profile.

Still another object is to provide a stock feed attachment in which a force tending to urge the stock toward the holding mechanism or collet of an automatic machine is maintained on the stock throughout the operation of the machine so as to effect an instantaneous, positive and accurate positioning of the stock each time the holding mechanism of the machine is opened resulting in increased productivity.

Still another object is to provide a feed attachment with a controlled first feed out so as to minimize waste of first piece.

Still another object of this invention is to provide a stock feed attachment constructed and arranged so as to provide a minimum of waste.

Another object is to provide a stock feed attachment that can accommodate any reasonable length of stock.

In accordance with this invention, the above objects, features and other advantages are attained by a stock feed attachment comprising essentially a stock slide constructed and arranged to accommodate either a given stock size or a range of different stock sizes. In this invention the given stock slide is removably disposed within a centralizing tube, the slide being rendered readily interchangeable with other slides so as to render the feed attachment adaptable for accommodating varying stock sizes. Feeding of the stock disposed in the stock slide is effected by a torque converter operating on an endless drive means. Connected to the endless drive means is a push bar which is adapted to engage the end of the stock within the stock slide. The torque converter comprises a fluid coupling disposed between a drive shaft and a driven shaft, the converter being operated to maintain a steady force on the stock during the feeding thereof. Thus the amount of foot-pound torque acting on the stock will instantaneously advance the stock the instant the holding mechanism of the automatic machine opens. Because of the steady application of force applied to the stock in the direction of feed, spring back to the stock is eliminated after the stock engages the machine stop.

A feature of this invention resides in a provision wherein the feed attachment is rendered readily adaptable to accommodate stock of different sizes, stock having either round or odd-shapes, or stock that is either flexible or inflexible, and/or any combination thereof.

Still another feature resides in the provision of a stock slide of the instant feed attachment constructed and arranged to prevent displacement of stock within the slide.

Another feature of the invention resides in the provision that the feed attachment eliminates feed fingers, and other troublesome feed mechanisms of the known bar stock feed constructions, and thereby effects substantial savings in initial cost as well as the costs of continuing maintenance and/or the replacement of parts.

Another feature resides in the provision of means to vary the torque on the type of stock material being fed and/or according to the size thereof.

Still another feature resides in the provision that the feed attachment is relatively simple in construction, trouble free, and positive in operation.

Other features and advantages will become more readily apparent when considered in view of the drawings and specifications, in which:

FIG. 1 is a side elevational view of the feed attachment of this invention illustrated in conjunction with schematically illustrated holding mechanism and stop of an automatic machine;

FIG. 2 is an end view of FIG. 1;

FIG. 3 is a view of an enlarged, fragmentary portion of the stock slide and pusher means taken along line 3—3 of FIG. 4;

FIG. 4 is a sectional view taken along line 4—4 of FIG. 3; and

FIG. 5 is a plan view of the motor mount and associated torque converter of this invention.

Referring to the drawings, the stock feed attachment 10 comprises a frame 11 formed of suitable structural frame members. Essentially the frame 11 consists of rectangularly disposed supporting leg structures 12, interconnected by longitudinal and transverse stringers 13 and 14, respectively. Supported on the frame 11 is a top 15. As seen in FIG. 2, a centralization tube 16 is fixed to the top 15 between suitable locating brackets 17. The centralization tube 16 comprises simply an elongated tube that extends substantially the length of the top 15, the latter being substantially co-extensive the length of the frame 11. As best seen in FIG. 4, the centralization tube 16 is provided with a quarter cut-out portion 16A, when viewed in cross-section, that extends the entire length of the tube 16.

Fitted into the centralization tube 16 is a stock slide tube 18. In accordance with this invention the slide tube 18 is provided with an outer circumference which is adapted to be snugly received within the bore 16B of the locating or centralizing tube 16. To accommodate stock of varying sizes or diameters, a plurality of stock slides, each having a common O.D. but varying thicknesses, are adapted to be interchangeably disposed within the centralization or outer tube 16. Thus for smaller diameter stock the slide tube 18 will have a greater thickness in cross-section than a stock slide tube adapted to accommodate a larger diameter stock.

As shown the slide tube 18 extends the length of the centralizing tube 16 and beyond to a point immediately adjacent the holding mechanism or collet 19 of an automatic machine, e.g. an automatic screw machine, turret lathe, axial feed saw cut-off and the like. Associated with such collets or holding mechanism 19 is a stop 20 to limit the positioning of the stock with respect to the holding mechanism 19.

In accordance with this invention the slide tube 18 is also provided with a cut-out portion 18A extending along the length thereof. The opening along the length is sufficiently large to receive the range of size of stock accommodated thereby.

As shown in FIG. 4, a feature of the slide tube 18 is that the upper edge portion 18B thereof, which defines the upper limit of the elongated opening, extends beyond the vertical centerline of the tube. The purpose of the overhanging portion 18B is to provide a restraint to limit a resulting bowing effect of the stock while it is being held in position by a rotating collet and being operated upon by the automatic machine.

Movably mounted on the frame is a pusher means. In accordance with this invention a pusher means or bar 21 is secured to an endless drive means 22. As shown the endless drive comprises a flexible chain or the like which is threaded over end idler rollers 23 and 24, which may be adjustable, and which are connected to each end of the frame; the pusher 21 being connected by a bracket 25 secured to and extending laterally of the upper flight chain 22A. As shown the endless chain 22 is disposed so that its upper flight 22A lies in a plane substantially coincident with the lower edge 16A of the cut-out portion of the tube 16. As shown in FIG. 4, the upper flight 22A of chain 22 is supported on the horizontal leg 22D of an angle support 22E so as to prohibit sagging. In the illustrated embodiment, the free end of the pusher bar 22 is provided with a live center 26. Thus when the feed attachment 10 is utilized in conjunction with automatic machine having a rotating collet, the bar stock being fed thereto is free to rotate therewith. In such instances the tendency of the rotating stock to flex or bow outwardly of the slide bar when the torque converted is applying a force thereon is restrained by the overhanging edge of the slide as will be described.

In accordance with this invention, a force is maintained on the stock, being fed against stop 20 and through the holding mechanism 19, by a torque converter acting on the chain drive 22. As shown, the torque converter 27 comprises a housing 28 in which a drive spindle 29 and a driven spindle 30 are coupled in driving relationship by a fluid coupling. Connected to the driven spindle 30 is a sprocket or pulley 31 arranged to mesh with the chain drive 22. Thus the chain 22 is driven by sprocket 31 in response to the actuation of the torque converter 27.

Means for actuating the torque converter 27 comprises a reversible three phase motor 32 which is connected in driving relationship thereto by a belt drive 33. In accordance with this invention the motor 32 is connected in driving relationship to the torque converter 27 in a manner so as to vary the torque or force transmitted to the chain drive 22 for a given stock size. In accordance with this invention this is attained by securing to the motor spindle 34 a split pulley 35 that is utilized in conjunction with a variable speed "V" belt 33. The motor 32 is mounted on the platform 36 for movement toward and away from the torque converter 27. This is attained by mounting the motor 32 retaining mounts in elongated slots 37. A screw jack 38 threaded to a bracket on the motor housing is utilized to advance or retract the motor 32 relative to the converter. Thus the relative movement of the motor 32 with respect to the torque converter effects a change in the r.p.m. of the torque converter accordingly. Consequently the amount of foot-pound-torque is varied accordingly. While the instant speed changes of the torque converter is attained by moving the motor 32 relative to the converter 27, it will be understood that the same may be effected by moving the converter 27 relative to the motor, or by relative movement of both the converter and the motor toward one another.

The operation of the feed attachment is as follows:

To feed a particular size bar, rod, tube size, molding or the like to an automatic machine, e.g. an automatic screw machine or the like, the proper size stock slide 18 for accommodating a given range of stock sizes is selected. The stock slide 18 is then positioned within the centralization tube 16 so that the end of the stock slide 18 is disposed adjacent the collet or holding mechanism 19 of the automatic machine. The pusher bar 22 is then positioned adjacent the end of the stock disposed in the slide 18. The motor 32 is then positioned relative to the converter 27 so that the proper force, depending on the stock material or size, may be transmitted thereto. With the adjustments set, energization of the motor 32, by closing of a suitable switch (not shown), will affect actuation of the torque converter 27. Actuation of the torque converter 27 will affect the operation on the chain drive 22 and movement of the pusher to advance the stock to the holding mechanism 19 of the automatic machine. Thus as the holding mechanism 19 opens, the stock is advanced up to the limit stop 20. When the stock is limited by the stop 20, the fluid coupling of torque converter begins to slip, and thus prohibits the stock bar from springing back away from the stop 20. With the torque converter maintaining a steady force on the bar stock, positive engagement of the stock against the stop is assured. As the bar stock is being maintained in its working operation, the torque converter is continually slipping; and dependent on the amount of its adjusted foot-pound-torque, it will be ready to push the stock forward the instant the holding mechanism 19 opens to again feed out or advance the stock up to its desired stop for the next operation without springing back. As a consequence, a positive and accurate piece is attained on each advance or feeding operation.

If desired, a limit switch 40 connected in the motor circuit may be disposed in position adjacent the end of the frame so as to be automatically actuated by the bracket 25 of the pusher bar 21 to reverse the motor after the last of the stock has been used up. The reversing of the motor 32 will then return the push bar to start position to ready the feed attachment 10 for accepting another length of stock. A second limit switch 40A may be disposed in the path of arm 25 to limit the return stock thereof.

Therefore, it will be readily apparent that the instant feed attachment is rendered readily adapted for use with a magazine or hopper attachment in which several stock bars of the same sizes can be automatically fed to the slide tube one after another for automatic operation. Thus the bar or stock feed attachment 10 can be used either as a single feed or with a magazine feed or hopper attachment. The feed attachment 10 can be used with equal facility with either a rotating machine or with a plain axial advance feed-out. Further the instant feed attachment 10 can be readily adapted to bar or stock sizes of varying dimensions simply by interchanging slide tube 18 corresponding to the stock size being fed.

The instant feed attachment 10 further eliminates the need of the troublesome feed finger, as is commonly used on known feed attachment.

Further, the instant feed attachment 10 is provided with means for effecting a controlled first feed out to minimize waste. Oftentimes it is essential that the end of the stock be machined at the start of the feed operation. Unless means for performing a controlled first feed-out were provided, the first piece cut from the stock would be wasted because the end of the stock engaging the stop 20 could not be machined.

In the instant case means are provided for limiting the first feed-out portion of the stock before the end of the stock engages the stop 20. This is attained in accordance with this invention by providing the feed attachment 10 with a first feed-out stop attachment 40C. Attachment 40C comprises an air cylinder or solenoid 41 mounted for longitudinal adjustment on frame by suitable bracket means 42. Adjusting slot 42A is provided in the horizontal arm 42B of the bracket means 42 to effect the desired adjustment. The cylinder or solenoid 41 is provided with a reciprocating stop or piston 41A which is adapted to move into operative protracted position to limit movement of chain 22 in the direction of feed toward stop 20 by blocking the movement of the push arm 25. In the inoperative retracted position the piston 41A is moved out of blocking position, thereby permitting advance of arm 25 for subsequent feeding.

In the operative position, the blocking piston 41A moves in front of arm 25, and thus blocks the chain against forward movement on the first feed-out. This blocking effect occurs before the end of the stock engages stop 20. The longitudinal slot 42A permits adjustment of the stop attachment 40C, so that the end of the stock on the first feed out can be disposed in the vicinity of the working tool of the automatic machine (not shown) where it can be properly machined. In this manner the end of the work piece may be worked on before it is made to engage the end stock. For this reason the first end piece of any stock is not wasted.

If desired, suitable controls may be provided to control the operating cycle of the feed out attachment. For example, a switch 44 may be disposed so as to be actuated by the arm 25 on the return stroke thereof upon reversal of the motor. Actuation of switch 44 will cause the piston 41A of the stop attachment 40C to protract toward operative position. On the feed of stock, the pusher arm 25 will advance the stock until it becomes blocked by piston 41A. As arm 25 hits piston 41A, a second switch 45 is actuated thereby to retract the piston 41A after a predetermined time delay, so that on the next feed-out operation, the arm 25 is free to advance the stock toward the stop 20. In this manner, the stop attachment 40C insures that the first piece is properly machined, and the waste thereof is eliminated.

Perhaps the most significant feature of the instant feed attachment is that the torque converter 27 effects a positive feed of the bar stock so as to prevent spring back when the stock is advanced to the feed stop of the holding mechanism.

While the instant invention has been disclosed with reference to a particular embodiment, it is to be appreciated that the invention is not to be taken as limited to all of the details thereof as modifications and variations thereof may be made without departing from the spirit or scope of the invention.

What is claimed is:

1. A stock feed attachment for use with automatic machines having a repetitive operation comprising a frame, an outer centralization tube having substantially a quarter cut-out portion extending along the length thereof, said outer tube being substantially co-extensive with the length of said frame, an inner stock receiving tube positioned within said outer tube, said inner tube being adapted to extend up to the holding mechanism of the automatic machine; said inner tube having a slot extending along the length thereof, said slot being coextensive and disposed in alignment with said cut-out portion of said outer tube so that the upper longitudinal edge of said slot extends beyond the vertical diameter of said inner tube, means for advancing an elongated stock supported in said inner tube toward the holding mechanism of said machine, said latter means including an endless flexible belt means, a torque converter means for driving said endless belt means, means connected to said belt means for engaging said work stock disposed in said inner tube to advance said stock as said torque converter means is rendered operative to drive said belt means, said torque converter means maintaining a constant force on said stock when the latter is in working operation so that upon release of the holding mechanism of said machine, the force maintained on said stock is utilized to positively advance the stock for the next operation.

2. A stock feed attachment for use with automatic machines having a repetitive operation comprising a frame, an outer centralization tube having substantially a quarter cut-out portion extending along the length thereof, a replaceable inner tube positioned within said outer tube, said inner tube being sized for receiving a given sized stock, said inner tube extending up to the holding mechanism of the automatic machine, said inner tube having a slot extending along the length thereof for receiving the stock placed therein, said slot being coextensive and disposed in alignment with the cut-out portion of said outer tube and to one side of the vertical diameter of said inner tube so that the upper longitudinal edge of said slot extends beyond the vertical diameter of said inner tube, means for advancing an elongated stock supported in said inner tube, said latter means including an endless flexible belt means, a torque converter means for driving said endless belt means, means connected to said belt means for engaging said stock disposed in said inner tube for advancing said stock as said torque converter means is rendered operative, said torque converter means maintaining said stock under a constant force on said stock when the latter is in working operation so that upon release of the holding mechanism of said machine, the force maintained on said stock is utilized to positively advance the stock for the next operation.

3. A stock feed attachment for use with automatic machines having a repetitive operation comprising a frame, an outer centralization tube having a cut-out portion extending along the length thereof, an inner stock receiving tube positioned within said outer tube, said inner tube extending substantially up to the holding mechanism of the automatic machine, said inner tube having a slot extending along the length thereof, said slot being disposed to one side of the vertical diameter of said inner tube so that the upper longitudinal edge of said slot extends beyond the vertical diameter of said inner tube, means for advancing an elongated stock supported in said inner tube, said latter means including an endless flexible drive means, a torque converter for driving said endless drive means, means connected to said endless drive means for engaging said work stock disposed in said inner tube for advancing said stock as said torque converter is rendered operative whereby said torque converter maintains a constant force on said stock when the latter is in working operation so that upon release of the holding mechanism of said machine the force maintained on said stock is utilized to positively advance the stock for the next operation.

4. A stock feed attachment for use with automatic machines having a repetitive operation comprising a frame, an outer centralization tube having substantially a quarter cut-out portion extending along the length thereof, said outer tube being substantially co-extensive with the length of said frame, a replaceable inner stock receiving tube positioned within said outer tube, said inner tube extending up to the holding mechanism of the automatic machine, said inner tube having a slot extending along the length thereof, said slot being open to one side of the vertical diameter of said inner tube so that the upper longitudinal edge of said slot extends beyond the vertical diameter of said inner tube, means for advancing an elongated stock supported in said inner tube, said latter means including an endless flexible drive means, a torque converter having a pulley, said flexible drive means being threaded to said pulley, a pusher means connected to said drive means for engaging said work stock disposed in said inner tube to advance said stock as said torque converter is rendered operative, a reversible motor, a drive belt connecting said torque converter in driving relationship with said motor, means for adjusting the position of said motor relative to said converter to effect the tension on said motor drive belt, said torque converter maintaining a constant force on said stock when the latter is in working operation so that upon release of the holding mechanism of said machine, the force maintained on said stock is utilized to positively advance the stock for the next operation.

5. A stock feed attachment adaptable for use with automatic machines having a repetitive operation comprising a frame, an outer centralization tube having substantially a quarter cut-out portion extending along the length thereof, said outer tube being substantially co-extensive with the length of said frame, an inner stock receiving tube positioned within said outer tube, said inner tube being adapted to extend up to a holding mechanism of an automatic machine; said inner tube having a slot extending along the length thereof, said slot being co-extensive and disposed in alignment with the cut-out portion of said outer tube so that the upper longitudinal edge of said slot extends beyond the vertical diameter of said inner tube, and means for advancing the stock within said inner tube toward the holding mechanism of the machine said latter means including idler rollers mounted adjacent each end of the frame, and endless flexible belt means threaded over said idler rollers, a fluid drive torque converter mounted on said frame, said converter including a drive spindle, a driven spindle, and a fluid coupling connecting the drive spindle in driving relationship with said driven spindle, a belt drive means connected to said driven spindle, said endless belt being threaded over said belt drive means, a reversible motor connected in driving relationship with said drive spindle of said torque converter for driving the same, a pusher means connected to said flexible belt to engage said stock for advancing the same in said inner tube, said torque converter maintaining a constant force as said stock tends to urge the same toward the holding mechanism when the latter is subjected to its working operation, and means for adjusting to position said motor relative to said torque converter.

6. A stock feed attachment adaptable for use with automatic machines having a repetitive operation comprising a frame, an outer centralization tube having substantially a quarter cut-out portion extending along the length thereof, said outer tube being substantially co-extensive with the length of said frame, an inner stock receiving tube positioned within said outer tube, said inner tube being adapted to extend up to the holding mechanism of an automatic machine; said inner tube having a slot extending along the length thereof, said slot being co-extensive and disposed in alignment with the cut-out portion of said outer tube so that the upper longitudinal edge of said slot extends beyond the vertical diameter of said inner tube, means for advancing the stock within said inner tube toward the holding mechanism of the machine whereby said means maintains a force tending to urge the stock toward the holding mechanism when the latter is subjected to its working operation, and means mounted on the frame for effecting a controlled first feed out for eliminating waste of the first piece, said latter means including a stop piston movable between operative and inoperative position, said piston in the operative position being protracted to block the movement of said stock advancing means in the direction of feed for the first feed-out of the stock.

References Cited by the Examiner

UNITED STATES PATENTS

| Re. 18,333 | 1/32 | Reeves. | |
|---|---|---|---|
| 2,108,274 | 2/38 | Tautz | 214—1.5 |
| 2,165,912 | 7/39 | Whitman | 214—1.5 |
| 2,674,779 | 4/54 | Herzog | 214—1.5 |
| 2,729,879 | 1/56 | Sampson | 214—1.4 X |
| 2,742,656 | 4/56 | Fischer | 214—1.4 X |

FOREIGN PATENTS 570,611   7/45   Great Britain.

HUGO O. SCHULZ, *Primary Examiner.*

ERNEST A. FALLER, *Examiner.*